3,068,145
TOPICAL PHARMACEUTICAL FORMULATIONS CONTAINING N,N - DIMETHYLACETAMIDE AS AN ANTI-INFLAMMATORY INGREDIENT
Eldridge M. Glenn, Kalamazoo, Mich., assignor to The Upjohn Company, Kalamazoo, Mich., a corporation of Michigan
No Drawing. Filed June 17, 1958, Ser. No. 742,482
8 Claims. (Cl. 167—58)

This invention relates to an anti-inflammatory pharmaceutical preparation and more particularly to an anti-inflammatory preparation containing N,N-dimethylacetamide.

The physiological mechanism for combating inflammatory conditions is extremely complex. The production of leucocytes and their mobilization at the site of the inflammation, the increased capillary permeability, the transfer of body fluid, the movement of plasma protein and lymphatic blockage each play a significant role in this complex physiological mechanism.

Various theories have been advanced to explain the initiation and progress of these protective reactions when the host is confronted with an inflammatory condition. It has been felt that a bacterial toxin was, in some instances, responsible for drawing the leucocytes to the focal point in the tissues. However, it was found that nucleic acid and certain of its derivatives, or some other principle supplied by the tissues, can stimulate the local mobilization of leucocytes. It has also been postulated that changes in the surface tension of the blood cell membrane are important in initiating the body defenses in the early stages of the inflammatory reaction. Workers in the area of inflammatory processes have sought a chemical explanation for the various physiological changes occurring during conditions of inflammation. Various substances have been prepared from inflammatory exudates and tested for their pharmacological properties. A nitrogen-containing polypeptide, a pseudoglobulin, a euglobulin fraction and a glycoprotein fraction, each showing certain effects concerned with resisting inflammation, can be isolated from inflammatory exudates. It is recognized that inflammation, in the absence of infection, is a manifestation of severe cellular injury involving the presence of vascular and lymphatic structures as well as tissue cells. However, the true causes of the inflammatory reactions are still a matter of conjecture.

In view of the unknown etiology in the gathering of the physiological defenses in inflammation, it is not surprising that a considerable variety of medication and treatment exists.

Injectable medication has included steroids, gold salts, iodide-salicylate-colchicine combinations; topical treatment has includes steroids, liniments, counterirritants, heat and cold treatments. Analgesics have been used with the above-mentioned medication and treatment.

In view of the unknown etiology and the widely varying treatment in inflammation, the search for efficacious anti-inflammatory agents has been unceasing. Until the present invention, a broadly effective anti-inflammatory agent for topical application has been unavailable.

It is an object, therefore, of the present invention to provide an anti-inflammatory pharmaceutical preparation suitable for topical application. It is an additional object to provide an anti-inflammatory pharmaceutical preparation suitable for the treatment of inflammatory conditions in the presence and absence of accompanying infections. It is a further object to provide such an anti-inflammatory preparation in non-toxic forms which are admirably suitable for the widely occurring afflictions in which the inflammatory process is manifested. Other objects will be apparent to those skilled in the art to which this invention pertains.

The above and additional objects have been accomplished by the provision of an anti-inflammatory pharmaceutical preparation comprising N,N-dimethylacetamide and a pharmaceutically acceptable topical carrier.

N,N-dimethylacetamide is a liquid of the formula $CH_3CO \cdot N(CH_3)_2$, having a boiling point of 64 degrees centigrade and a specific gravity of 0.850. It is miscible with water and fixed oils in all proportions. Any dimethylamine and ammonia can be removed from N,N-dimethylacetamide by the method outlined in U.S. Patent 2,829,088.

Examples of suitable topical forms in accord with this invention are an ointment, a lotion, a cream, a paste, a jelly, a powder, and a fixed oil solution.

The general method for the preparation of a specific dosage unit form involves the incorporation of the principal active ingredient, N,N-dimethylacetamide, with any complementary active and supplementary ingredients, into the dosage unit form by dispersing in a fixed oil, homogenizing into a cream, ointment, jelly or lotion, and like techniques depending on the type of dosage unit form desired.

The amount of active ingredient can vary over a wide range, from about one to about ninety percent by weight being operative in the final composition.

Various complementary active ingredients can be used with the principal active ingredient to provide desirable therapeutic effects. Analgesics, for example, benzyl alcohol and menthol, can be utilized. Anti-bacterials and anti-biotics, for example, bacitracir, polymyxin, and tetracyclines, can be utilized. Anti-inflammatory corticosteroids are especially useful complementary active ingredients. Anti-inflammatory corticosteroid is intended to mean those adrenal corticosteroids and their derivatives which possess local anti-inflammatory activity. These corticosteroids include prednisone, prednisolone, 6-methylprednisolone, hydrocortisone, and 9α-fluoro-16α-hydroxyprednisolone. The free alcohols, and the esters of the above compounds, for example, the acetate, the hemisuccinate and the sodium succinate, are included.

Likewise, various supplementary ingredients can be used in the novel composition. The topical preparations can include preservatives, for example, benzyl alcohol, methylparaben, and propylparaben; topical bases, for example, petrolatum, carbowax, spermaceti, cetyl alcohol, emulsifiers, and the like.

The compositions of this invention possess utility in the topical treatment of inflammatory conditions and especially in inflammatory-infective conditions wherein the anti-bacterial action of N,N-dimethylacetamide is beneficial.

The anti-inflammatory action of the compositions of the invention have been demonstrated by the modified granuloma pouch technique of Robert and Nezamis, Acta Endocrinologia 25, 105–112 (1957). This technique utilizes the measurement of the inflammatory exudate formed in a pouch resulting from the injection of air and croton oil into the middle of a rat's back. The validity of this technique as a measure of anti-inflammatory action has been demonstrated by the reduction of exudate formation in the pouch by hydrocortisone, a compound with known antiphlogistic action.

Table I contains the data on the reduction of the volume of exudate by the injection of an aqueous solution containing twenty percent by weight of N,N-dimethylacetamide. One milliliter of 0.5 croton oil and the test solution were injected into the pouch on day one. The volume of exudate was measured in the sacrificed rats on day eight. Six rats were used at each level of test.

TABLE I

| Amount of test solution: | Amount of exudate, cc. |
|---|---|
| None | 8.5 |
| 0.2 cc | 8.3 |
| 1.0 cc | 6.6 |
| 1.5 cc | 3.0 |

Table II contains the data on the reduction of the volume of exudate by the injection of an aqueous solution containing fifty percent by weight of N,N-dimethylacetamide. One-half milliliter of one percent croton oil was injected into the pouch on day one. On days one, two and three, two varying doses of the test solution as a fifty percent solution in cottonseed oil were injected. The amount of exudate was measured on day eight.

TABLE II

| Amount of test solution: | Amount of exudate cc. |
|---|---|
| None | 6.2 |
| 0.2 cc | 0.3 |
| 0.5 cc | 0.1 |

Table III contains the data on the reduction in the volume of exudate resulting from the topical application of a cream containing N,N-dimethylacetamide. One-half milliliter of one percent croton oil was injected into the pouch on day one. A fifty percent solution of N,N-dimethylacetamide (DMA) in methocel cream was applied on days one and two to the outer skin surface of the pouch. The amount of exudate was measured on day seven.

TABLE III

| Test solution: | Amount of exudate, cc. |
|---|---|
| None | 11.0 |
| 50% DMA | 1.8 |
| Methocel control | 9.5 |

It is apparent that the data in Tables I and II, and the data in Table III, show that N,N-dimethylacetamide is singularly effective in reducing the amount of inflammatory exudate.

Table IV contains the data on the reduction in the amount of inflammatory exudate resulting from the subcutaneous injection of N,N-dimethylacetamide (DMA). One-half milliliter of one percent croton oil was injected into the pouch on day one. The test solutions were injected into the anterior chest wall on day two and the amount of exudate measured on day six.

TABLE IV

| Test solution: | Amount of exudate, cc. |
|---|---|
| None | 6.6 |
| Oil control | 4.2 |
| 0.2 ml. DMA in oil | 2.4 |
| 0.4 ml. DMA in oil | 1.3 |

These data show that N,N-dimethylacetamide is effective by subcutaneous injection in reducing the amount of inflammatory exudate.

Table V contains the data on the reduction in the amount of inflammatory exudate resulting from the oral administration of N,N-dimethylacetamide (DMA). One-half milliliter of one percent croton oil was injected into the pouch on day one. Oral treatment with fifty percent N,N-dimethylacetamide in cottonseed oil was given on days two, three, four and five. The amount of exudate was measured on day six.

TABLE V

| Test solution: | Amount of exudate, cc. |
|---|---|
| None | 5.0 |
| Oil control | 5.2 |
| 0.2 ml. DMA in oil | 1.0 |
| 0.4 ml. DMA in oil | 0.2 |

These data show that N,N-dimethylacetamide is effective by the oral route in reducing the amount of inflammatory exudate.

Further studies were run on human subjects to ascertain the reduction of inflammation caused by the application of mustard plaster to the skin. Mustard plaster inflammatory areas were created on the forearms of five female and five male subjects. The N,N-dimethylacetamide was applied to the inflammatory area as a solution in a carbowax base. Photographs of the various treatments and subjects were made one, two and four hours following removal of various treatments. Since black and white photographs would probably not show too well, the results of these studies are set forth in tabular form. Table VI indicates results obtained from "blind" analysis of the extent of inflamation by three observers.

TABLE VI

Results of Visual Impressions of Anti-Inflammatory Activity of N,N-DMA on Human Subjects (Mustard Plaster Test)

| Treatment | Number of observations | Observer | | | Average degree of inflammation [1] |
|---|---|---|---|---|---|
| | | 1 | 2 | 3 | |
| None | 10 | 2.2 | 2.0 | 1.9 | 2.0 |
| DMA Base: 30% Ethanol | 10 | 2.4 | 2.8 | 2.3 | 2.5 |
| Hydrocortisone Base | 10 | 2.0 | 2.0 | 2.2 | 2.1 |
| Hydrocortisone: 1% | 10 | 1.6 | 1.8 | 1.2 | 1.5 |
| 5% DMA | 10 | 1.8 | 2.0 | 2.1 | 1.9 |
| 10% DMA | 10 | 1.5 | 1.5 | 1.2 | 1.4 |
| 20% DMA | 10 | 1.0 | 1.0 | 0.6 | 0.9 |
| 30% DMA | 10 | 1.5 | 0.6 | 0.7 | 0.9 |

[1] Results are expressed in arbitrary units of 1, 2, 3, 4+. Above results were done by the initialed examiner in a "blind-study" fashion from photographs of the forearms of all subjects.

It is evident that N,N-dimethylacetamide is effective in reducing the inflammatory process resulting from mustard plaster application.

The following examples are to set forth the best mode contemplated by the applicants of carrying out this invention but are not to be construed as limiting.

EXAMPLE 1.—OINTMENT

A. 1000 grams of ointment are prepared from the following types and amounts of materials:

| | Grams |
|---|---|
| Polyethylene glycol 4000 | 400 |
| Polyethylene glycol 300 | 300 |
| N,N-dimethylacetamide 300 | 300 |

The two polyethylene glycols are melted together at about 65 degrees centigrade, with stirring. The N,N-dimethylacetamide is added and the whole mixed until homogeneous. The mixture is allowed to cool, with occasional stirring, until congealed at room temperature. This ointment is suitable for topical application to inflamed areas.

B. Five grams of prednisolone succinate sodium can be added to the above formula with beneficial results.

EXAMPLE 2.—OIL SOLUTION

A. Ten gallons of a fixed oil solution are prepared from the following types and amounts of materials:

| Chlorobutanol | grams | 189 |
|---|---|---|
| Sesame oil, sterile | gallons | 8 |
| N,N-dimethylacetamide | do | 2 |

The chlorobutanol is dissolved in the sesame oil and the oil solution is well mixed with the N,N-dimethylacetamide. The whole is then sterilized by passage through a bacterial filter and filled into vials. This solution is suitable for topical application in controlling inflammation.

B. 189 grams of 6-methylprednisolone can be added to the above formula with especially beneficial results in inflammatory conditions.

EXAMPLE 3.—CREAM

A. 38 pounds of cream are prepared from the following types and amounts of materials:

|  | lbs. | oz. | grains |
|---|---|---|---|
| 10% N,N-dimethylacetamide | 3 | 13 |  |
| 5% Propylene glycol | 1 | 14 | 175 |
| 0.3% n-Butyl-p-hydroxybenzoate |  | 1 | 361 |
| 0.2% Methylparaben |  | 1 | 95 |
| 2% Polysorbate 80 USP |  | 12 | 70 |
| 18% Tegacid regular [1] | 6 | 13 |  |
| 7% Spermaceti |  |  |  |
| Deionized water, q.s. |  |  |  |

[1] A glyceryl monostearate-diethylaminoethyl alkyl amide phosphate.

The tegacid and spermaceti are melted together by warming at about 75 degrees centigrade. The hydroxybenzoate and the paraben are dissolved in the propylene glycol by warming. The water, N,N-dimethylacetamide and the polysorbate are mixed together with warming. The propylene glycol solution and the water phase are then well mixed with stirring. The tegacid-spermaceti melt is then added to the aqueous phase, with stirring, and allowed to cool at room temperature until the whole is congealed. This cream is satisfactory for local application to inflamed skin areas. The amount of N,N-dimethylacetamide can be increased to twenty percent or thirty percent by substituting the required amount of this ingredient for the 3 lbs. 13 oz. used above.

B. 258 grams of hydrocortisone can be added to the above formula with beneficial results in inflammatory conditions.

EXAMPLE 4.—NON-DRYING CREAM

A. 4000 grams of a non-drying cream are prepared from the following types and amounts of materials:

|  | Grams |
|---|---|
| Mineral oil | 580 |
| Spermaceti | 80 |
| Cetyl alcohol | 80 |
| Propylparaben | 8 |
| Methylparaben | 12 |
| Polyethylene glycol 300 | 200 |
| Polysorbate 80 U.S.P. | 80 |
| Tegacid regular | 320 |
| N,N-dimethylacetamide | 800 |
| Deionized water, q.s. |  |

The spermaceti and cetyl alcohol are melted in the mineral oil. To this mixture is added the parabens, the polyethylene glycol, the water, the N,N-dimethylacetamide and the polysorbate, with warming. The tegacid is added at about seventy degrees centigrade. The whole is heated to about 85 degrees centigrade. The mixture is allowed to congeal, with stirring, at room temperature. This cream is suitable for application to local areas of skin inflammation.

EXAMPLE 5.—PULVERULENT COMPOSITION 100 pounds of a pulverulent composition is prepared from the following types and amounts of ingredients:

|  | Lbs. |
|---|---|
| N,N-dimethylacetamide | 5 |
| Calcium carbonate, powdered | 47.5 |
| Talc, powdered | 47.5 |

The N,N-dimethylacetamide is gradually worked into the mixture of the calcium carbonate and the talc. The whole mixture is milled unitl homogeneous. This composition is suitable for dusting on inflamed areas.

EXAMPLE 6.—LOTION

A. 10,000 milliliters of a topical lotion are prepared from the following types and amounts of ingredients.

Each milliliter:  Total, milliliters
- 30% v./v. N,N-dimethylacetamide _____ 3000
- 20% v./v. deionized water _____ 2000
- 10% v./v. polyethylene glycol 400 _____ 1000
- 20% v./v. isopropanol _____ 2000
- 20% v./v. propylene glycol _____ 2000

The N,N-dimethylacetamide and water are well mixed together. To this mixture the other ingredients are added in the following order: polyethylene glycol, isopropanol and propylene glycol. The whole is well mixed. This composition can be packaged in an aerosol type container. The composition is also suitable for use as a conventional lotion, as by padding on the inflamed area or by gauze application.

B. Fifty grams of 9α-fluoro-16α-hydroxyprednisolone can be added to the above formula with especially beneficial results in inflammatory conditions.

EXAMPLE 7.—LOTION 5000 milliliters of a topical lotion are prepared from the following types and amounts of ingredients, using the procedure of Example 6.

Each milliliter:  Total, milliliters
- 80% v./v. N, N-dimethylacetamide _____ 4000
- 5% v./v. deionized water _____ 250
- 5% v./v. polyethylene glycol 400 _____ 250
- 5% v./v. isopropanol _____ 250
- 5% v./v. propylene glycol _____ 250

This lotion is especially suitable for local application by a wet dressing.

It is to be understood that the invention is not to be limited to the exact details of operation or exact compositions shown and described herein as obvious modifications and equivalents will be apparent to one skilled in the art, and the invention is therefore to be limited only by the scope of the appended claims.

What is claimed is:

1. An anti-inflammatory pharmaceutical ointment comprising from about one to about ninety percent by weight of said ointment of N,N,-dimethylacetamide as the essential ingredient.

2. The ointment of claim 1 which contains in addition an anti-inflammatory corticosteroid.

3. An anti-inflammatory pharmaceutical lotion comprising from about one to about ninety percent by weight of said lotion of N,N-diemthylacetamide as the essential anti-inflammatory ingredient, water, polytheylene glycol 400, isopropanol, and propylene glycol.

4. The lotion of claim 3 which contains in addition an anti-inflammatory corticosteroid.

5. An anti-inflammatory pharmaceutical pulverulent composition comprising from about one to about 33 percent by weight of said composition of N,N-diemthylacetamide as the essential anti-inflammatory ingredient.

6. The pulverulent composition of claim 5 which contains in addition an anti-inflammatory corticosteroid.

7. An anti-inflammatory fixed oil pharmaceutical solution comprising from about one to about ninety percent by weight of said oil of N,N-dimethylacetamide as the essential anti-inflammatory ingredient.

8. The fixed oil pharmaceutical solution of claim 7 which contains in addition an anti-inflammatory corticosteroid.

(References on following page)

References Cited in the file of this patent

UNITED STATES PATENTS

| | | |
|---|---|---|
| 2,671,748 | Crooks | Mar. 9, 1954 |
| 2,990,333 | Graham | June 27, 1961 |

OTHER REFERENCES

Squibb Abstract Bulletin, vol. 24, No. 31, August 1, 1951, p. A-695.

Rees et al.: Arch. Biochem. and Biophys., vol. 63, 1956, pp. 144–159.

C.A., vol. 41, 1947, p. 5632f.

C.A., vol. 49, 1955, p. 14171e.

C.A., vol. 50, 1956, p. 9627b.

J.A.M.A., vol. 152, No. 4, May 23, 1953, pp. 323–331.

Kostenbauder: J.A.P.A., Sci. Ed., vol. 45 (1956), pp. 518 et seq.